Figure 1:
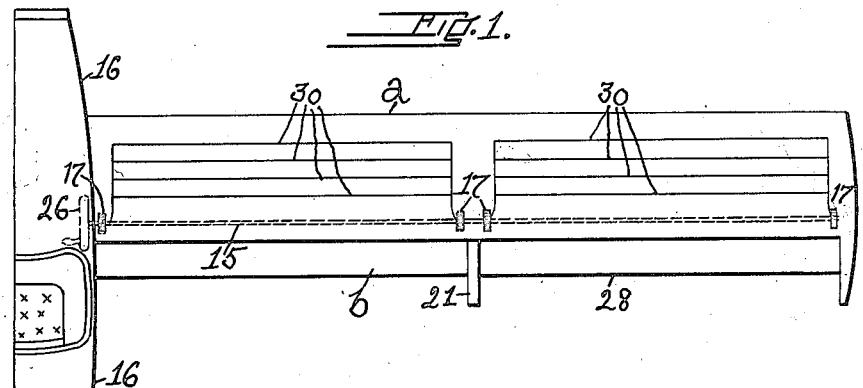

May 29, 1923.

F. R. MAXWELL, JR

AIRPLANE

Filed April 13, 1921    3 Sheets-Sheet 1

1,456,643

Inventor:
Frank R. Maxwell Jr.
by Jas. H. Churchill
atty.

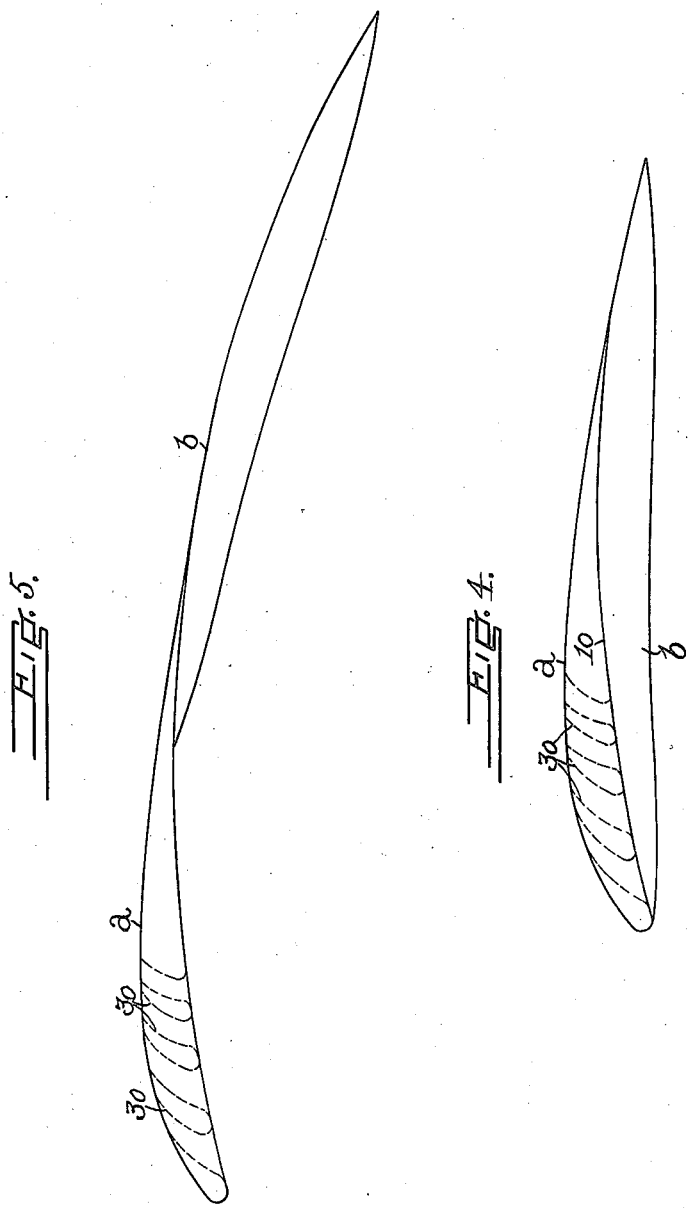

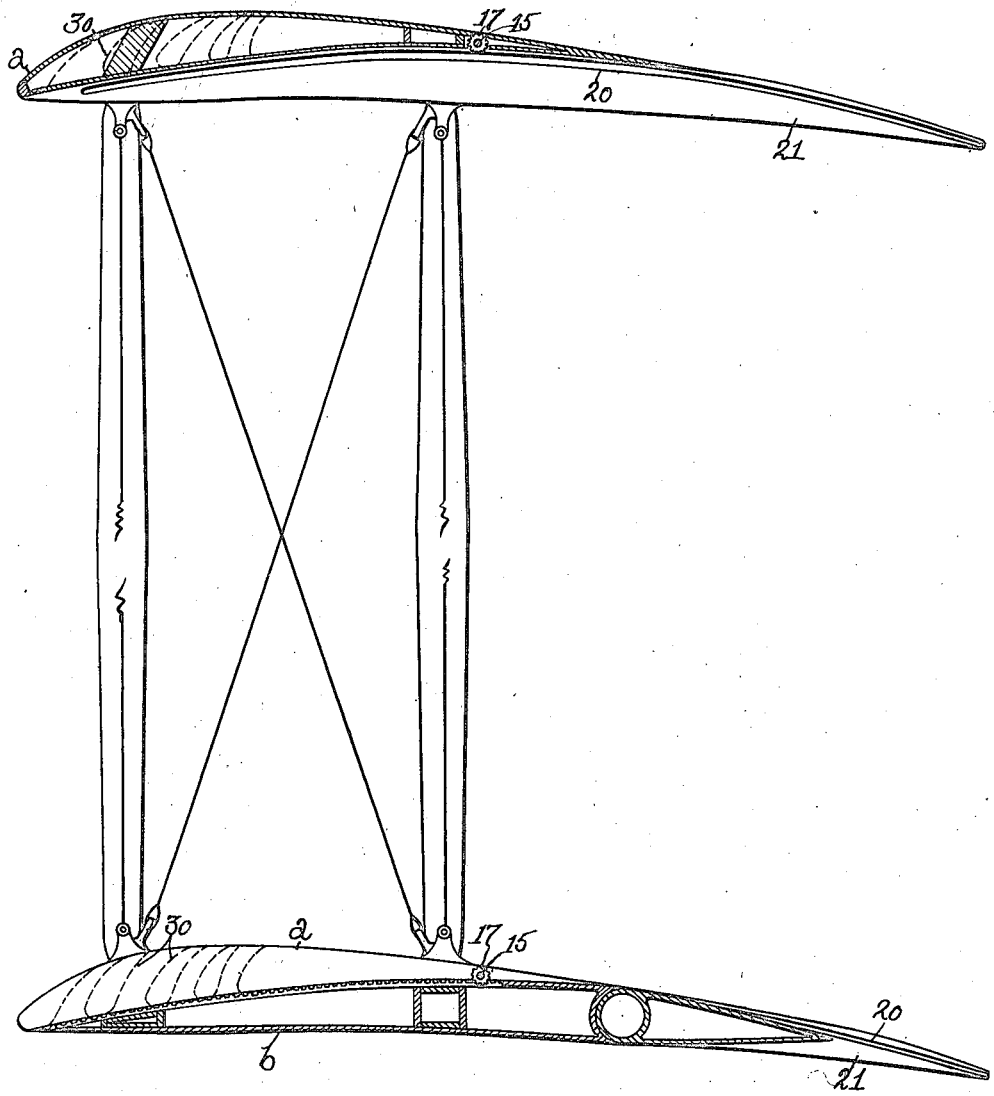

Patented May 29, 1923.

1,456,643

UNITED STATES PATENT OFFICE.

FRANK R. MAXWELL, JR., OF DEDHAM, MASSACHUSETTS.

AIRPLANE.

Application filed April 13, 1921. Serial No. 460,925.

*To all whom it may concern:*

Be it known that I, FRANK R. MAXWELL, Jr., a citizen of the United States, residing in Dedham, in the county of Norfolk and State of Massachusetts, have invented an Improvement in Airplanes, of which the following description, in connection with the accompanying drawings, is a specification, like characters on the drawings representing like parts.

This invention concerns aeroplanes and relates more particularly to an improved wing construction or aerofoil for use in aeroplanes. As at present constructed aerofoils represent a compromise between that design which is best adapted for attaining a high speed and that which is most suitable for lifting a heavy load. In the starting and landing of an aeroplane, it is particularly desirable to have a maximum lift capacity, with a relatively low speed, this being especially true in landing, where the contact of the running gear with the ground, when traveling at speeds approximating those which the plane attains in the air, is a very frequent source of injury not only to the machine but also to the operator. On the other hand, when the aeroplane has attained the proper height it is desirable, in order to attain high speed, without an excessive expenditure of power, that the air resistance or drift component be small, but with wing construction of the usual type it is impossible to reduce the drift component to the desired minimum by reason of the necessity of providing sufficient lift for starting and landing. Thus, in attaining the desired speeds it is necessary to expend power very wastefully. Moreover, as the fuselage structure is usually so disposed as respects the supporting element as to reduce the parasite resistance to a minimum at the normal angle of incidence of flight, it is clear that when the angle of incidence is increased by inclining the supporting surfaces in climbing or in landing, the position of the fuselage is varied accordingly, to the great discomfort of the occupant, while by reason of the varying angles at which the fuselage may thus be caused to approach the ground, it is difficult to provide landing gear capable of operating effectively under all circumstances.

The fundamental formula relating to sustentation is $W = K_y A V_2$; where W represents the total load, $K_y$ = the lift coefficient in lbs. per sq. ft. m. p. h., A = the total area of the wings, V = the velocity of the machine in m. p. h. W and V being constant, it is evident that only by varying $K_y$ and A will it be possible to vary the performance of any given aerofoil. The total area A may evidently be varied, this being a structural feature, and the variation of the area thus offers one solution of the problem adapting the aerofoil to use both in a machine for carrying heavy loads and in a high speed or racing type of machine. The other variable, $K_y$, varies in accordance with variable camber of the wing, with the angle of incidence of the wing, and also with the design or contour of the wing, and particularly with the form of the nose, or advancing edge, of the wing and its trailing edge.

For stability in flight there should be a minimum of variation in the position of the fore-and-aft center of pressure, and this fact must constantly be kept in mind in devising any arrangement for varying the area, angle or incidence, or camber during flight, as otherwise the elevators or other controls may be loaded beyond their capacity in attempting to compensate for the shifted center of pressure.

As ordinarily constructed, the only means of varying the angle of incidence consists in causing the entire structure to assume an angle to the direction of the air current, and while the various parts of the machine, including the fuselage, may be designed to offer a minimum resistance to the air current at the minimum angle of incidence, any such tipping of the machine as a whole, exposes additional area, thereby tending to offset the gain in lifting power effected by increasing the angle of incidence. When, moreover, the angle of incidence is increased beyond a certain amount, it is found that further increase results in loss of lifting efficiency, due to the discontinuity of the air stream in passing rearwardly over the top surface of the plane, although from a practical standpoint, it would evidently be advantageous if the lift increased proportionately to the angle of incidence through all angles of the latter.

A wing having a high camber provides a greater lifting effect than does a flatter wing, but such a highly cambered wing has the disadvantage that it offers high resistance to passage through the air. Usually the camber is so calculated that it represents a substantial compromise between that which would give high lift at slow speeds and the nearly flat plane which should give the best results at maximum speeds.

The principal object of the present invention is to provide an aerofoil of a type permitting both of the values A and K$y$ in the above equation to be varied simultaneously by the manipulation of a single controlling element, and in a certain manner, such as to permit a simultaneous increase or decrease in area, camber, and angle of incidence of the aerofoil, but without substantially changing the center of pressure in a fore-and-aft direction such as would in any manner tend to throw the machine out of balance and without disproportionate increase in the drift component. Briefly, the invention may be stated to consist in providing an aerofoil comprising a member which is fixed as respects the fuselage structure and which provides the advancing edge of the aerofoil, and having combined therewith a second member normally lying snugly against the surface of the fixed member, but capable of being moved rearwardly with respect to the latter in such manner as to increase the supporting area to a substantial extent, the contour of the composite structure when in normal position being such as has been demonstrated to give maximum efficiency in operation. The movable section is of a contour such that as it is moved rearwardly the angle of incidence of the composite supporting surface is increased, and simultaneously therewith its camber is increased, the fore-and-aft center of pressure however, being substantially unchanged during such movement. Preferably the fixed plane member is provided with a series of slots extending along its forward edge from bottom to top, thus providing passages for air from the lower side of the wing to the upper side thereof. This arrangement is highly advantageous when employing high angles of incidence, permitting the plane to work at high efficiency even at angles far beyond those normally considered to be the maximum permissible. Preferably also the movable section of the plane is so disposed that when contracted, it covers the slots in the front edge of the main or fixed wing section. It is thus evident that as the movable section is caused to travel rearwardly, the angle of incidence is increased correspondingly with the uncovering of the aforesaid openings, thus automatically compensating for the increased angle of incidence, and resulting in a maximum lift even at high angles of incidence but without unduly increasing the resistance to forward motion. As the forward edge of the main or fixed plane is not moved during such adjustment, its calculated contour is unchanged, thus securing a maximum of efficiency at the nose or leading edge at all times. Moreover, while the position of the rear edge is varied, its contour is unchanged, so that there is no decrease in the efficiency of this edge. As thus constructed it is found that the center of pressure of the aerofoil moves but slightly in a front-to-rear direction, even though the movable section be extended to its fullest extent, so that there is little if any tendency to throw the machine out of balance and but little movement of the elevator is necessary to compensate therefor. Moreover, with this arrangement, the angle of incidence may be varied without varying the position of the main or fixed plane, or causing the fuselage to assume an abnormal position, so that the angle of incidence may be changed without increasing the parasite resistance, and without causing the fuselage to assume a position which is unpleasant for the occupant or such as makes it difficult properly to land. As thus provided, the aerofoil is capable of a high lift at relatively low speed in starting and in landing, while also permitting a minimum angle of incidence and minimum camber to be employed during flight and when high speeds are desired.

These and other features of this invention will be pointed out in the claims at the end of this specification.

Fig. 1 is a plan view of a sufficient portion of an airplane embodying this invention to enable it to be understood, the wing members being shown in their nested position.

Figure 2:
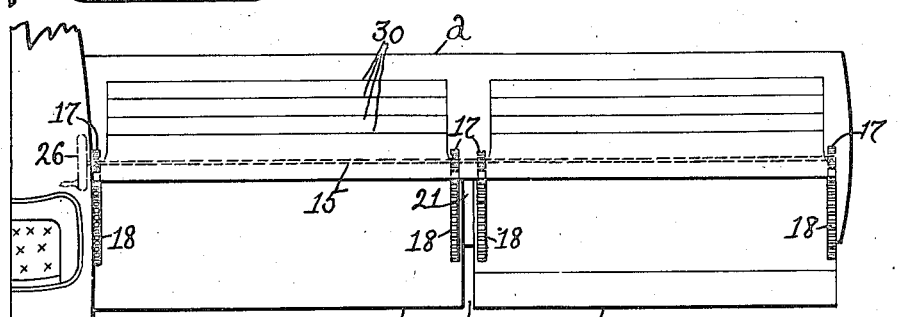

Fig. 2, a view like Fig. 1 with the wing members in their opened-up position.

Figure 3:
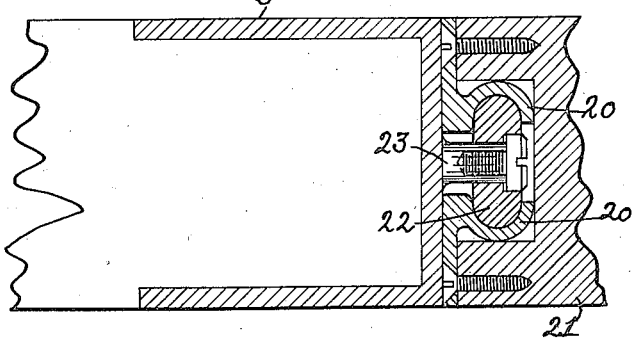

Fig. 3, an enlarged detail to be referred to.

Fig. 4, a diagrammatic view of the wing shown in Fig. 1.

Fig. 5, a like view of the wing shown in Fig. 2, and

Fig. 6, a cross sectional view of the wings of a biplane, the movable member of the upper wing being omitted and the movable member of the lower wing being shown in section.

Referring to Fig. 4 an aerofoil of usual contour is illustrated, the section preferably employed being of that form technically known as U. S. A. 27. The present aerofoil, however, as distinguished from those ordinarily employed, is divided into upper and lower members $a$, $b$, respectively; which normally occupy the relative positions shown in Fig. 4, and thus constitute complemental elements of a composite aerofoil, the lower member resting within the concave under surface of the upper member. The member $a$ is secured in fixed relation to the fuselage or body of the aeroplane and is hereinafter referred to as the stationary or main member of the aerofoil.

While other arrangements may be employed, the meeting surfaces of the members *a* and *b* are preferably substantially cylindrical, the chord of the member *a* normally inclining upwardly and rearwardly with respect to the chord of the composite structure. The member *b*, hereinafter referred to as the movable or adjustable element of the aerofoil, is arranged to slide bodily rearwardly as respects the member *b* in an arcuate path thereby increasing the effective area of the supporting surface without, however, interfering with its continuity. Preferably, the forward edge of the member *b*, when in normal position, intersects the under surface of the member *a* rearwardly to the leading edge of the latter, so that movement of the member *b* to the rear does not change the contour of such leading edge. The radius of curvature of the meeting faces of members *a* and *b* bear such relation to the chosen section and normal fore-and-aft width of the aerofoil, that upon rearward adjustment of the member *b* the increase of the angle of incidence thereby resulting bears a relatively small ratio to the increase in area and maintains the position of the center of pressure substantially constant. Any desired structural arrangement may be employed in forming the members *a* and *b* whereby to secure the necessary strength and rigidity in all positions of the parts.

The member *b* may be moved bodily in any suitable manner, and in the present instance, this is effected by means of a rotatable shaft 15 extended longitudinally of the stationary member *a* from the body or fuselage 16 to near the end or tip of the said member and suitably supported by transverse beams or members 21 of the wing frame, said shaft being provided with pinions 17 which mesh with rack bars 18 affixed to the movable member *b*, as represented in Figs. 2 and 6.

The movable member *b* is guided in its bodily movement at its opposite ends by means of suitable tracks or ways 20, formed in the transverse members 21 of the stationary member *a*, and in which run rollers 22 mounted on journals 23 affixed to the movable wing member *b*. The tracks or ways 20 may be of any suitable or desired construction. In the present instance the shaft 15 is shown as provided with four pinions 17, two of which are located at the opposite ends of the wing member *a* and two near the longitudinal center thereof, and the wing member *b* is provided with four rack bars 18 cooperating with said pinions.

The movable wing member *b* may and preferably will be provided near its longitudinal center with a slot 25 extended from its rear edge 26 toward but not to the front edge thereof, for the reception of the transverse member 21 of the stationary member *a*, which member 21 may and preferably will support the tracks or ways 20 on its opposite sides for the reception of the rollers 22 carried by the side walls of the slot 25 in the wing member *b*.

The shaft 15 may be rotated by an operator in the body or fuselage 16 by means of a hand wheel 26 or otherwise. The wing members *a*, *b*, are made of substantially the same width and section throughout their length, and the movable member *b* may be provided with a pivoted rear section 28 forming an aileron, or the aileron may be otherwise attached to the plane, in which case the movable section 28 may form a stationary part of the wing member *b*. The aileron may be operated from the body 16 in any suitable or usual manner.

The stationary member *a* is provided with one and preferably with a plurality of comparatively narrow slots 30, see Figs. 1, 2 and 6, which are located near the front or advancing edge or nose of said member and are extended substantially the length of the said member in a direction transverse to the direction of flight. The slots 30 serve to permit the flow of air from the under to the upper surface of the wing and at relatively large angles of incidence materially reduce the undesirable effect known as "burbling" by maintaining the continuity of the air stream flowing over the upper surface of the plane. This not only provides a substantially uniform and high ratio of lift to angle of incidence even for high values of the latter, but also decreases the power consumed at any given angle of incidence to a very marked degree.

In the present instance said slots are controlled by the movable member *b*, one or more being uncovered when the member *b* is moved to increase the area of the wing, and being covered when the member *b* is moved into its closed-in position. With the above arrangement it is found that when the member *b* is moved rearwardly the fore-and-aft center of pressure changes but little, and with a standard section such as above referred to, and a radius of curvature of the meeting surfaces of the members *a* and *b* of the relative value herein disclosed, the position of the center of pressure remains substantially constant at all angles of incidence between 7° and 16°. This stability of the center of pressure can probably be accounted for, in part at least, by reason of the fact that in the present device the contour and location of the advancing edge or nose of the member *a* is invariable, and that while the rear or trailing edge of the plane varies its position from time to time, the continuity of the upper surface of the plane is unbroken and the shape of the rear edge is substantially unchanged. In this connection it is also to be noted that the relative positions of the member a and the fuselage are not changed in varying the angle of incidence which also tends in large measure to increase the strength and therefore the stability of the structure as a whole.

In Figs. 1 and 4, the wing members a, b, are in what may be considered their closed-in or nested condition or position, and in Figs. 2 and 5, in their expanded or opened position or condition.

By reference to Fig. 4, it will be seen that the wing members a, b, when in their nested position, form a wing of standard shape and section such as now commonly used, and in this particular case of the contour of section known as U. S. A. 27, which has been demonstrated to be most efficient when speed is desired and which presents a minimum of surface area, camber and angle of incidence.

By reference to Fig. 5, it will be seen that when the wing members are in their opened-up position, the surface area, the camber and the angle of incidence are materially increased, thereby attaining the advantages of increased lift heretofore noted.

It is also to be noted that when the member b is moved to increase the surface area, camber and angle of incidence, the slots 30 in the stationary member a are uncovered more or less, thus further adding to the lifting power while reducing the power necessary for driving the machine.

It will thus be seen, that the operator by a single control, to wit, the hand wheel 26, can obtain a maximum lifting power when desired, or can reduce the resistance to forward motion to the minimum by bodily moving the member b of a wing of substantially standard shape and section.

By the term standard shape and section, I desire to be understood to mean those which have been shown by actual experience to give the best results under actual service conditions, a type of which is the above mentioned U. S. A. 27.

One embodiment of the invention is herein shown, but it is not desired to limit the invention to the particular construction shown.

Claims.

1. An aerofoil comprising a supporting element constructed and arranged to be normally fixed to a fuselage structure, such supporting element having a slot therethrough closely adjacent to its forward edge and extending transversely of the line of flight, said slot being relatively narrow in a fore and aft direction, and a movable member co-operating with said fixed member to constitute the supporting surface, such member being bodily movable in a fore and aft direction with relation to the first-named member whereby to cover and uncover said slot.

2. An aerofoil comprising a supporting element provided with a slot extending therethrough transversely of the line of flight, such slot being arranged adjacent to the advancing edge of said element and being normally covered, and means for simultaneously uncovering said slot and increasing the angle of incidence of the aerofoil.

3. An aerofoil comprising a supporting element provided with a slot extending longitudinally of its advancing edge, said slot being normally covered, and means for simultaneously uncovering said slot and for providing additional supporting surface to the rear of said element.

4. An aerofoil comprising a supporting element having a longitudinal slot just to the rear of its advancing edge, a movable supporting member normally lying substantially in contact with the first-named element and covering said slot, and means for sliding said member rearwardly simultaneously to uncover said slot and to add supporting surface at the rear edge of the fixed element.

5. An aerofoil comprising an integral supporting element having a plurality of slots therethrough extending longitudinally of and just to the rear of its advancing edge, means normally closing said slots, and means permitting the successive uncovering of said slots beginning with the foremost thereof while simultaneously increasing the angle of incidence of the aerofoil.

6. An aerofoil comprising a fixed supporting element of predetermined contour and having a slot therethrough extending longitudinally of and adjacent to its advancing edge, and a movable and rigid supporting member having an upper surface conforming substantially to the lower surface of the fixed member and normally underlying the same and closing said slot, and means for sliding said movable member rearwardly whereby simultaneously to uncover said slot and to increase the effective supporting area of the aerofoil.

7. In an airplane, a stationary member provided with a slot transversely disposed with relation to the line of flight, a movable member co-operating with said stationary member to form a complete wing of substantially standard shape and section when closed in or nested, and covering said slot in its nested position, said movable member being bodily movable rearwardly beyond the rear edge of said stationary member and suitably shaped with relation to the latter to form a complete wing of increased area and camber and having an increased angle of incidence.

In testimony whereof, I have signed my name to this specification.

FRANK R. MAXWELL, Jr.